(12) United States Patent
Haataja et al.

(10) Patent No.: US 6,925,242 B2
(45) Date of Patent: Aug. 2, 2005

(54) OPTICAL CABLE EXIT TROUGH

(75) Inventors: Timothy Jon Haataja, Prior Lake, MN (US); Thomas Walter Kampf, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/871,641

(22) Filed: Jun. 18, 2004

(65) Prior Publication Data

US 2004/0228599 A1 Nov. 18, 2004

Related U.S. Application Data

(60) Continuation of application No. 10/457,749, filed on Jun. 9, 2003, which is a continuation of application No. 09/745,299, filed on Dec. 20, 2000, now Pat. No. 6,597,854, which is a continuation of application No. 09/354,594, filed on Jul. 16, 1999, now Pat. No. 6,192,181, which is a division of application No. 08/971,421, filed on Nov. 17, 1997, now Pat. No. 5,937,131.

(51) Int. Cl.$^7$ .............................. G02B 6/00; G02B 6/50
(52) U.S. Cl. ...................................... 385/136; 385/137
(58) Field of Search ................................ 385/134–137, 385/147

(56) References Cited

U.S. PATENT DOCUMENTS

| | | |
|---|---|---|
| 3,001,001 A | 9/1961 | Bibb |
| 4,163,572 A | 8/1979 | Benscoter |
| 4,366,341 A | 12/1982 | van Riet |
| 4,860,168 A | 8/1989 | Wiljanen et al. |
| 4,926,009 A | 5/1990 | Van Leeuwen |
| 5,067,678 A | 11/1991 | Henneberger et al. |
| 5,142,606 A | 8/1992 | Carney et al. |
| 5,316,243 A | 5/1994 | Henneberger |
| 5,316,244 A | 5/1994 | Zetena, Jr. |
| 5,399,814 A | 3/1995 | Staber et al. |
| 5,402,515 A | 3/1995 | Vidacovich et al. |
| 5,530,787 A | 6/1996 | Arnett |
| 5,872,336 A | 2/1999 | Long |
| 5,937,131 A | 8/1999 | Haataja et al. |
| 6,192,181 B1 | 2/2001 | Haataja et al. |
| 6,597,854 B2 | 7/2003 | Haataja et al. |

FOREIGN PATENT DOCUMENTS

| | | |
|---|---|---|
| DE | 37 42 448 A1 | 6/1989 |
| FR | 1207610 | 6/1958 |
| FR | 2488064 | 7/1980 |
| GB | 2137025 A | 2/1984 |

OTHER PUBLICATIONS

ADC Telecommunications brochure entitled "FiberGuide® Fiber Management Systems," 33 pages, dated Oct., 1995.
Warren & Brown & Staff brochure pages entitled "lightpaths," Issue 2, 11 pages, dated 1995.

(Continued)

Primary Examiner—Phan T. H. Palmer
(74) Attorney, Agent, or Firm—Merchant & Gould P.C.

(57) ABSTRACT

A cable exit trough is mountable to a lateral trough section either during initial assembly of the cable routing system, or at a later date. The exit trough includes a bracket portion mountable to the top edge of one of the sides of the lateral trough section. Two lead-ins are provided to lead the cable in an upward direction from the lateral trough section to the exit trough. The exit trough includes an exit trough portion extending from the bracket portion upwardly away from the lateral trough section. The exit trough portion includes a convexly curved bottom trough surface, and two convexly curved upstanding sides. The exit trough portion and the lead-ins define a cable pathway from the lateral trough section to an exit point of the exit trough portion which can either lead downwardly relative to the lateral trough section, or horizontally.

18 Claims, 16 Drawing Sheets

OTHER PUBLICATIONS

Warren & Brown & Staff Pty Ltd brochure pages entitled "Optical Fibre Ductwork," 2 pages, undated.

ADC Telecommunications brochure entitled "Fiber Guide™ Fiber Management System," 6 pages, dated Jun., 1989.

AT&T Network Systems literature entitled, "Facility Network Management System," 3 pages, the third page of which is dated Mar. 27, 1991.

AT&T advertisement literature entitled, "Facility Network Management System" believed to correspond to system shown in Exhibit E, p. 3 of which is dated Mar. 27, 1991.

"Memorandum Opinion and Order" filed Apr. 24, 2002 by United States District Court Judge Ann Montgomery in the action titled ADC Telecommunications, Inc. v. Panduit Corp., Civil No. 01–477 ADM/AJB, pp. 1–24.

"Defendant's Prior Art List" dated Oct. 1, 2001 in the action titled ADC Telecommunications, Inc. v. Panduit Corp., Civil Action No. 01–CV–477 ADM/AJB. pp. 1–29.

"Report No.: 02.3–02" by Eric Pearson Technologies Incorporated, served Apr. 22, 2002, in the action titled ADC Telecommunications, Inc. v. Panduit Corp., Civil Action No. 01–CV–477 ADM/AJB. pp. 1–37 and Exhibits 1 and 2.

"Defendant's Responses to Plantiff's First Set of Interrogatories" dated Dec. 14, 2001 in the action titled ADC Telecommunications, Inc. v. Fiber Management Solutions, Inc., Case No. CV 01 3974 ADS, pp.1–12.

OPTICAL CABLE EXIT TROUGH

CROSS REFERENCE TO RELATED APPLICATIONS

This application is a continuation of application Ser. No. 10/457,749, filed Jun. 9, 2003, which is a continuation application of Ser. No. 09/745,299, filed Dec. 20, 2000, now U.S. Pat. No. 6,597,854 B2, which is a continuation of application Ser. No. 09/354,594, filed Jul. 16, 1999, now U.S. Pat. No. 6,192,181 B1, which is a divisional of application Ser. No. 08/971,421, filed Nov. 17, 1997, now U.S. Pat. No. 5,937,131. The above listed applications are incorporated herein by reference.

FIELD OF THE INVENTION

The invention pertains to a system for the management and routing of optical fiber cables.

BACKGROUND OF THE INVENTION

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

SUMMARY OF THE INVENTION

According to preferred embodiments of the present invention, a cable routing system is disclosed for routing optical fiber cables between optical transmission equipment. The system includes a lateral trough section configured for defining a cable pathway. An exit trough is mountable to the lateral trough section to provide a cable exit pathway from the lateral trough section. The exit trough includes a bracket portion mountable to a top edge of the lateral trough section. Two curved lead-ins on opposite ends of the bracket portion each define a cable pathway leading to an exit trough portion extending from a middle of the bracket portion in a direction away from the lateral trough section. The exit trough portion includes a convexly curved bottom trough surface, and two convexly curved upstanding sides on opposite sides of the bottom trough surface. The exit trough defines a cable pathway leading upwardly and away from the lateral trough section. The exit trough is mountable to the lateral trough section without modification to the lateral trough section.

The exit trough can be placed generally at any location along the lateral trough section, and can be placed during initial system setup, or at a later time as the need arises for an exit pathway from the lateral trough section, such as when new optical transmission equipment is added to the system. At least one fastener secures the bracket portion to the lateral trough section. The exit trough may include a downspout portion defining a downwardly directed cable pathway, or a horizontal portion defining a horizontally directed cable pathway, or other directional pathway as desired.

DETAILED DESCRIPTION OF THE PREFERRED EMBODIMENTS

Figure 1:
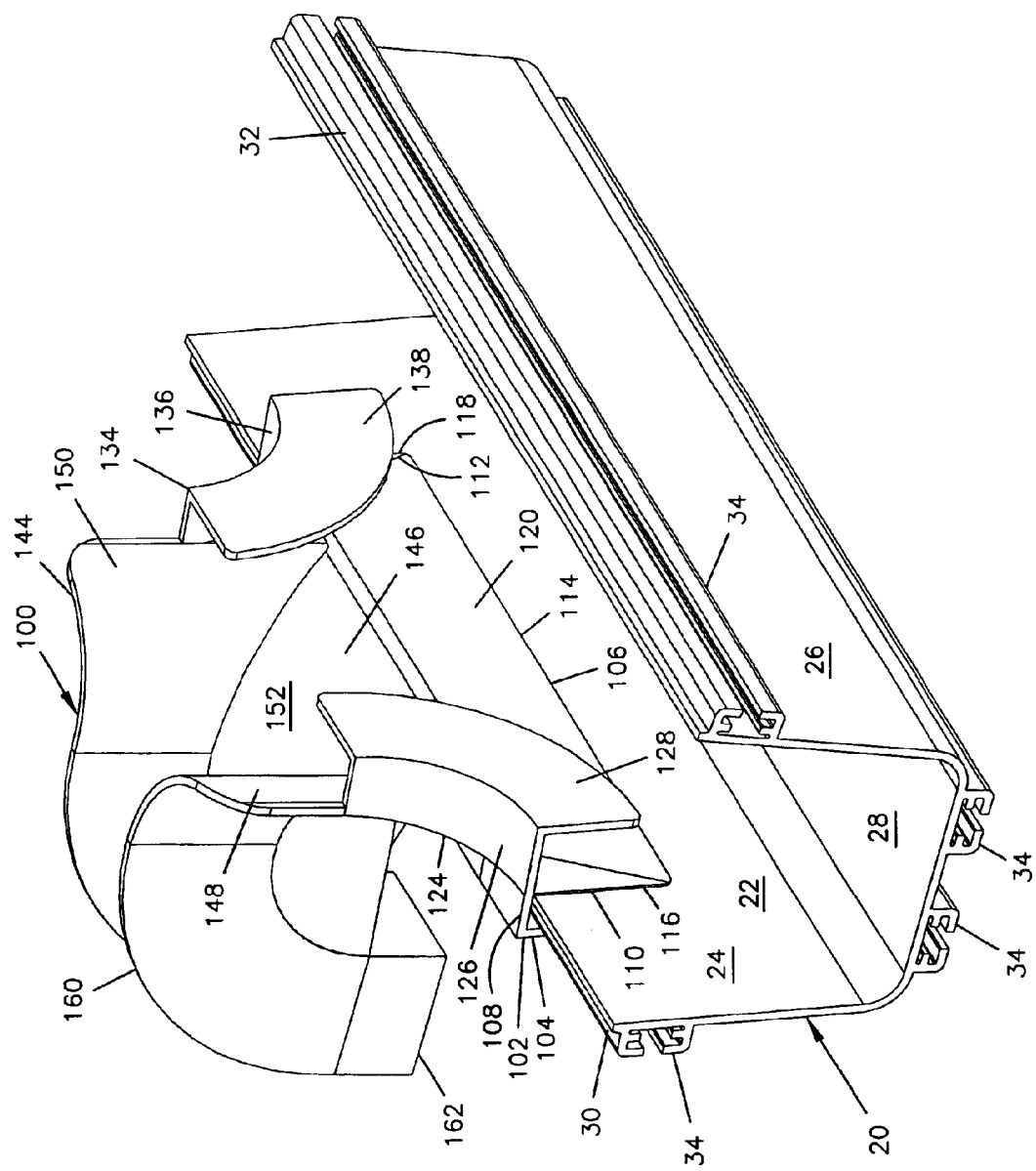
FIG. 1 is a top, front, and left side perspective view of a lateral trough section and an exit trough mounted thereto according to one preferred embodiment of the present invention.

Referring now to FIGS. 1–8, a first embodiment of an exit trough 100 is shown mounted to a lateral trough section 20. Lateral trough section 20 defines a cable pathway 22 for routing optical fiber cables between locations. Lateral trough section 20 and exit trough 100 can be part of a cable routing system typically within a structure, such as a building having optical fiber signal transmitting equipment. Lateral trough section 20 typically is suspended from a ceiling structure by any suitable means (not shown). U.S. Pat. Nos. 5,067,678 and 5,316,243 disclose various cable routing systems, including lateral trough sections like lateral trough section 20 illustrated in FIGS. 1–8. Exit trough 100 is not only usable with lateral trough section 20 shown in FIGS. 1–8, but also with other cable routing systems disclosed in U.S. Pat. Nos. 5,067,678 and 5,316,243, the disclosures of which are hereby incorporated by reference, and other cable routing systems.

Generally, lateral trough section 20 includes first and second upstanding sides 24, 26, and a bottom 28 extending therebetween and defining cable pathway 22. Side 24 includes a top edge 30. Opposite side 26 also includes similar top edge 32. Lateral trough section 20 includes a plurality of attachment members 34 on an outside portion for use in attaching lateral trough sections 20 together end to end, or adding other system hardware.

As will be described below, exit trough 100 mounts to lateral trough section 20 adjacent to top edge 30 of side 24 through attachment member 34. Exit trough 100 creates a cable exit pathway from lateral trough section 20.

Figure 2:
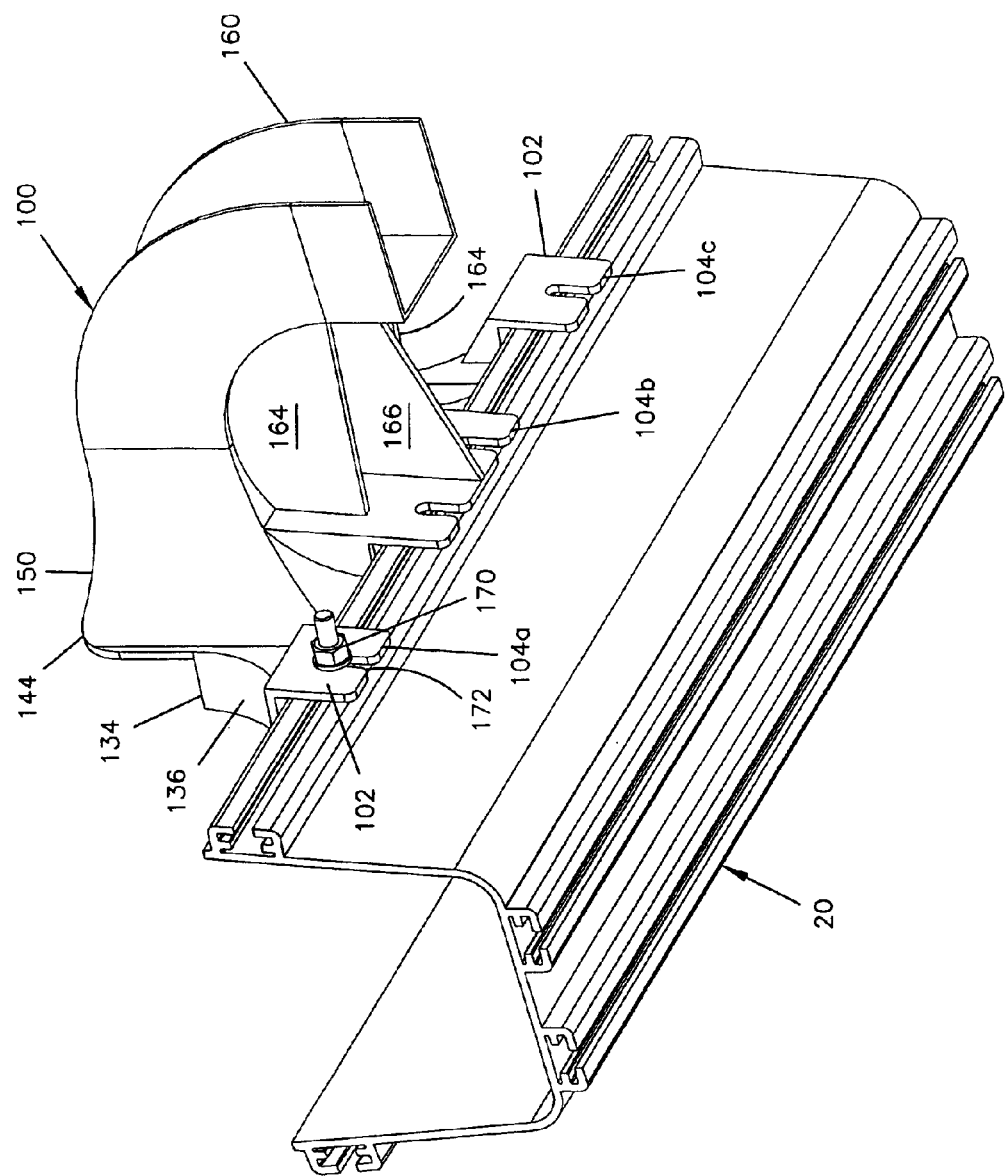
FIG. 2 is a bottom, back, and right side perspective view of the first embodiment.
Figure 3:
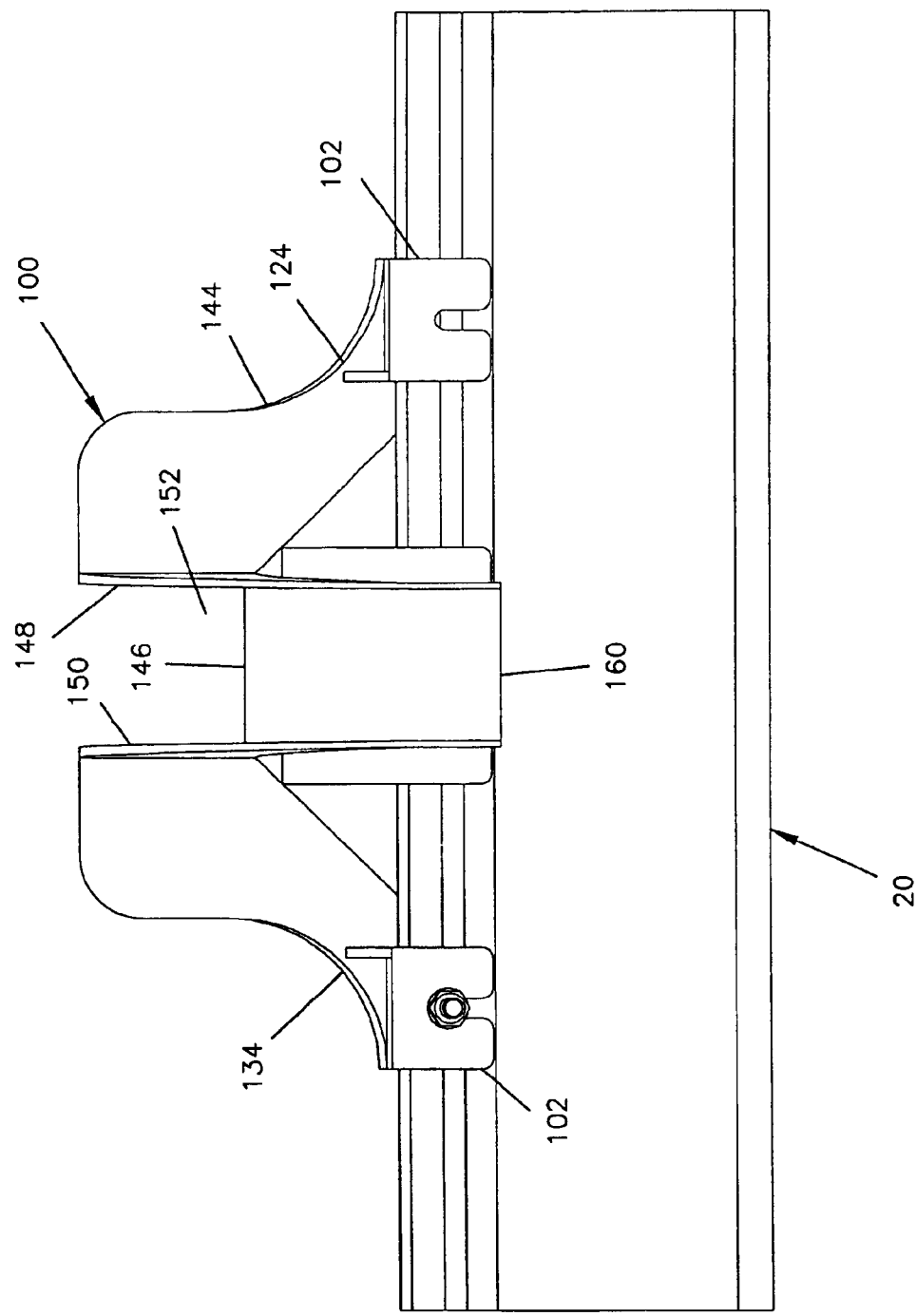
FIG. 3 is a back view of the first embodiment.
Figure 4:
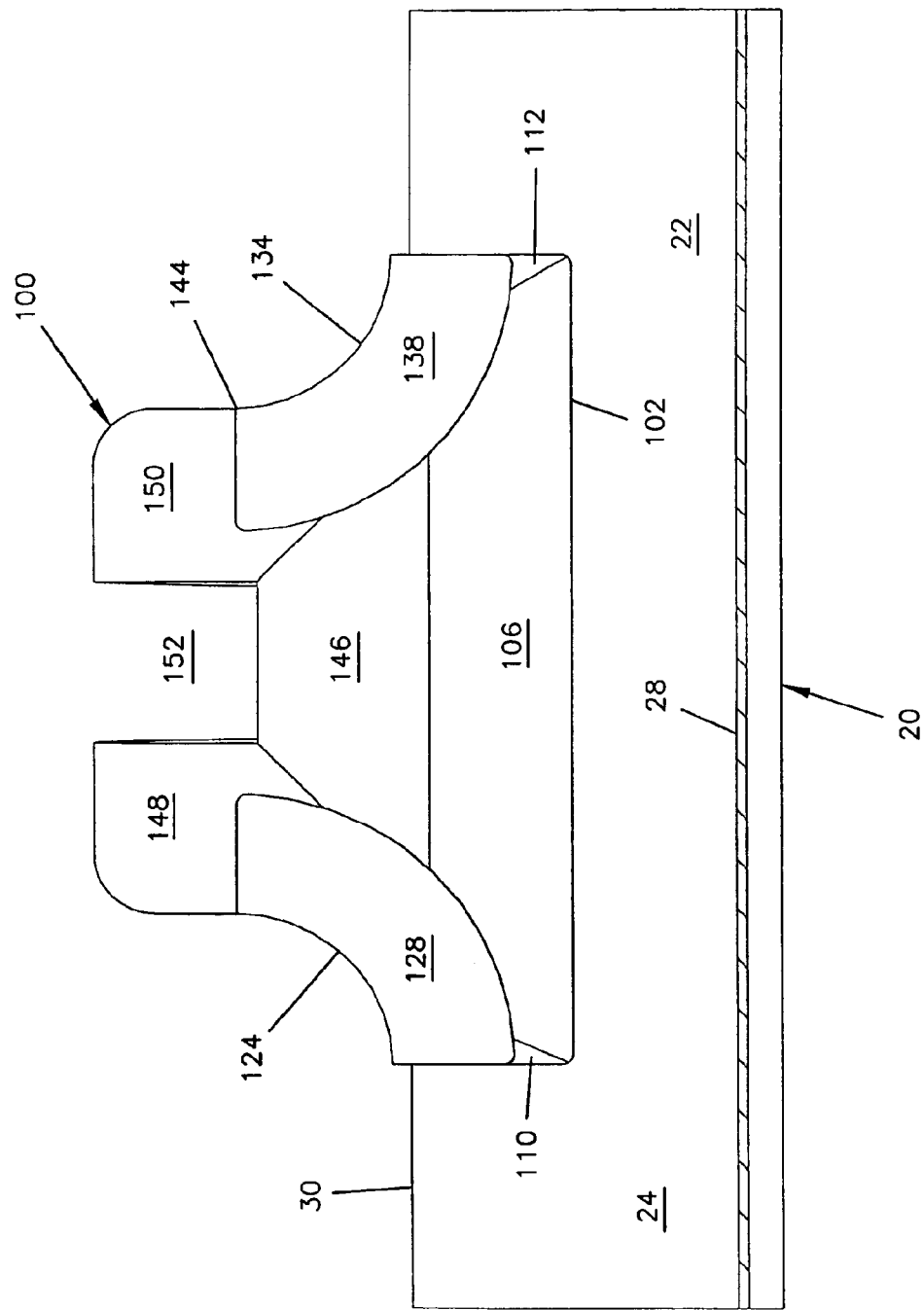
FIG. 4 is a front view of the first embodiment, and showing the lateral trough section in cross-section through a middle of the lateral trough section.
Figure 5:
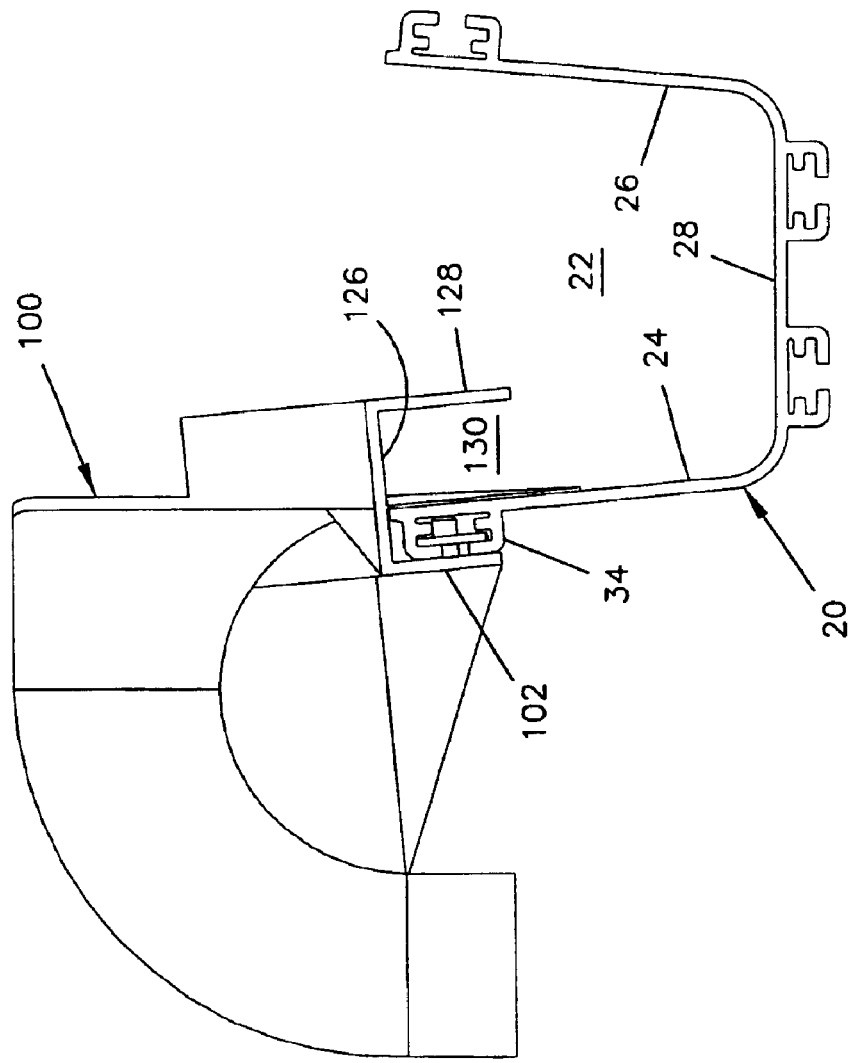
FIG. 5 is a left side view of the first embodiment.
Figure 6:
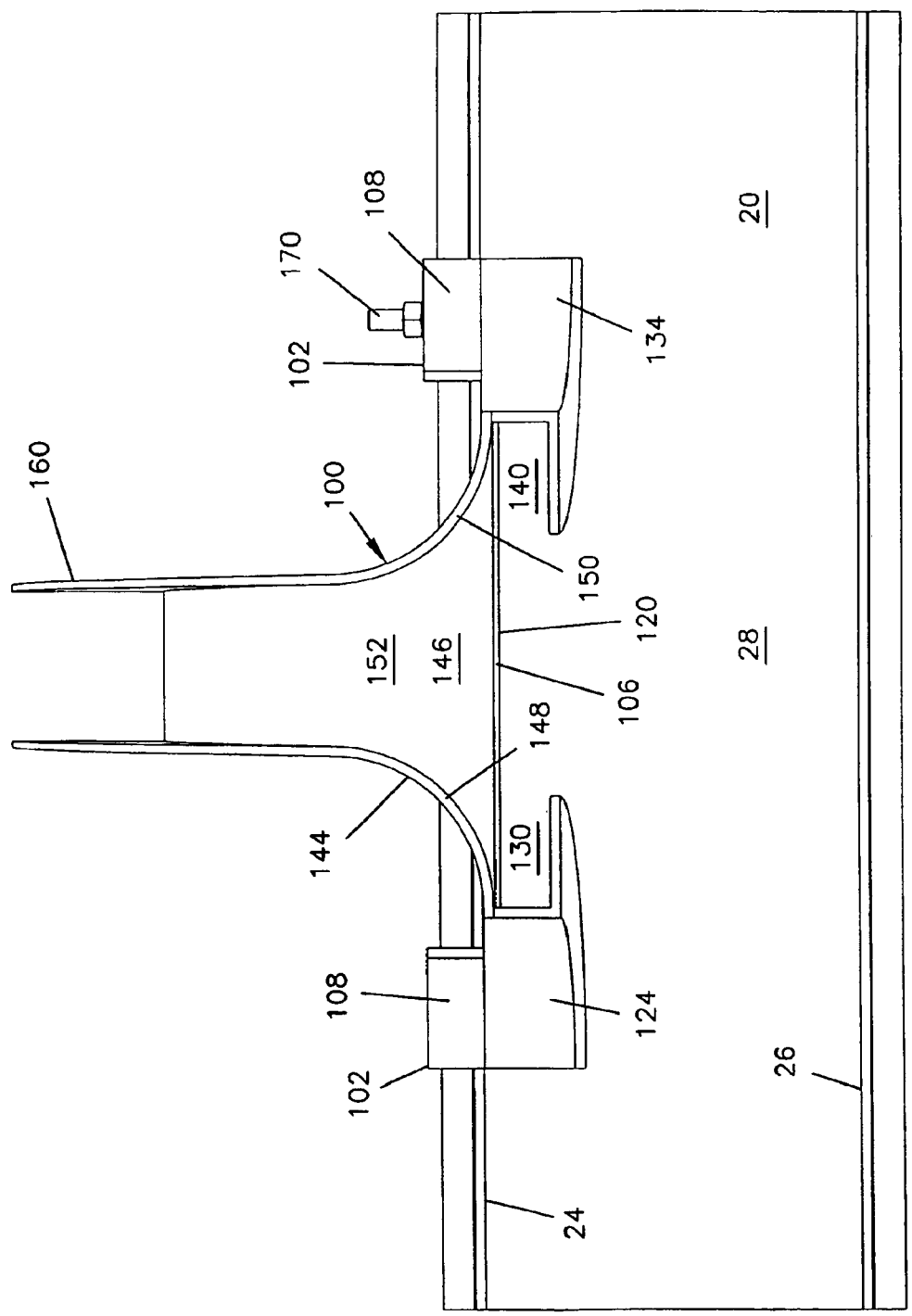
FIG. 6 is a top view of the first embodiment.
Figure 7:
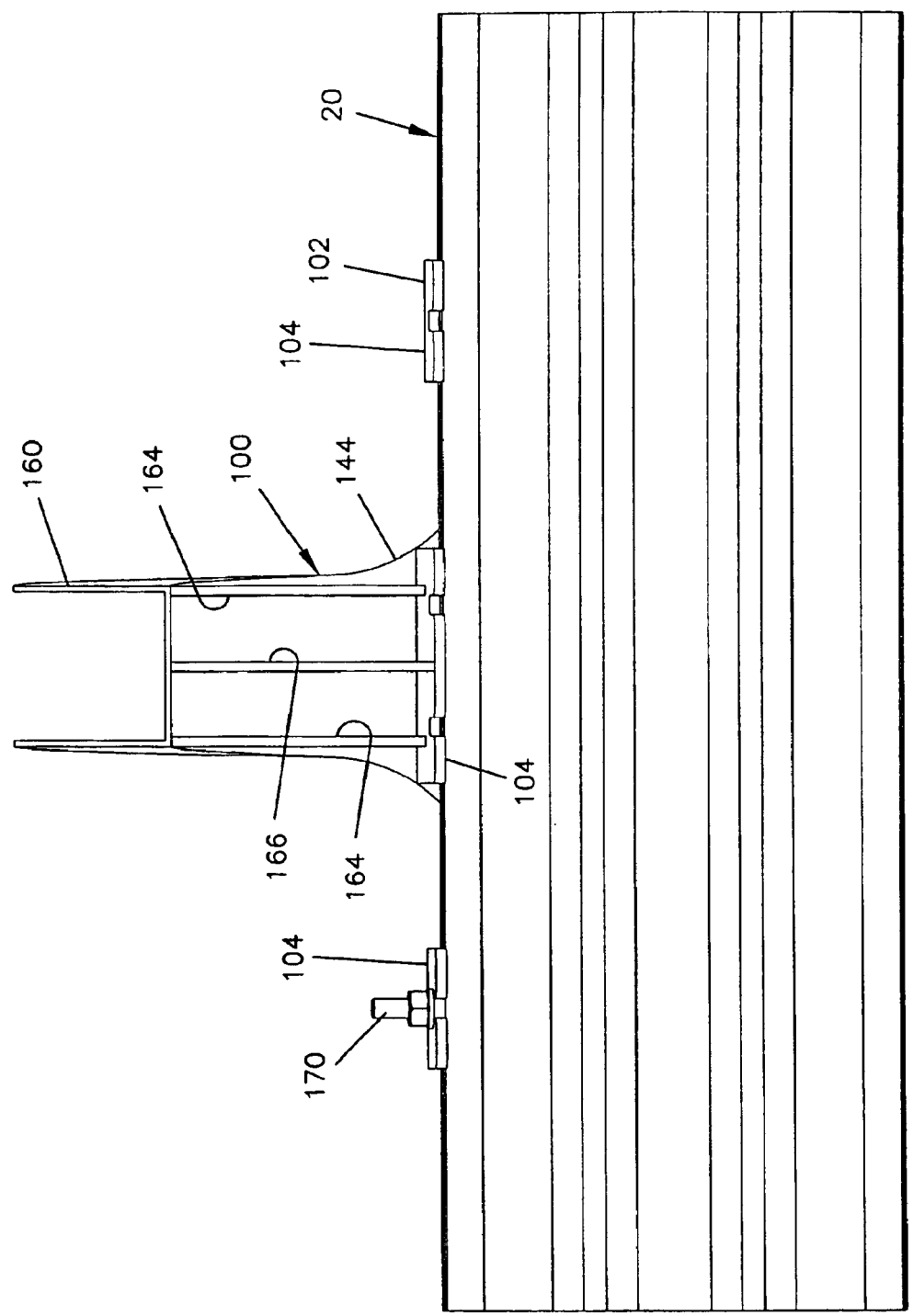
FIG. 7 is a bottom view of the first embodiment.
Figure 8:
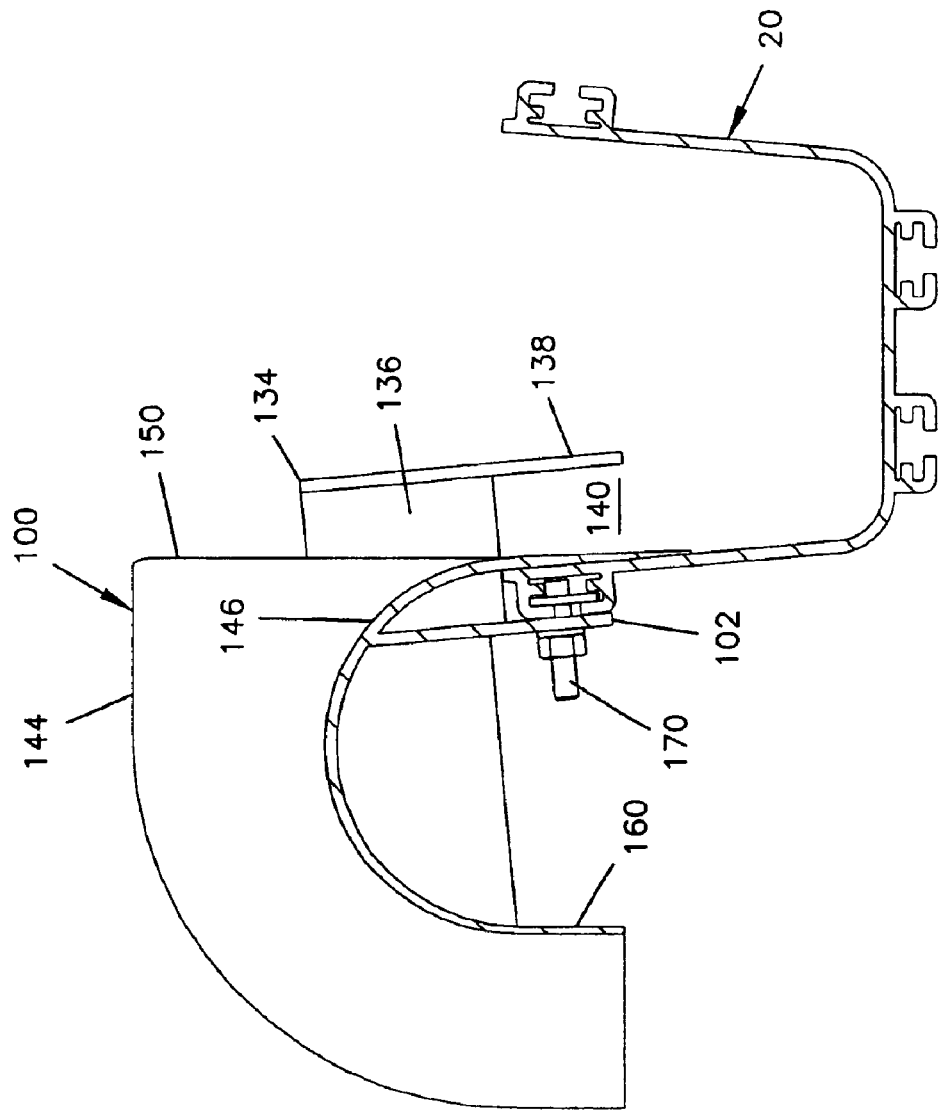
FIG. 8 is a left cross-sectional side view through the center of the lateral trough section and through the exit trough.
Figure 9:
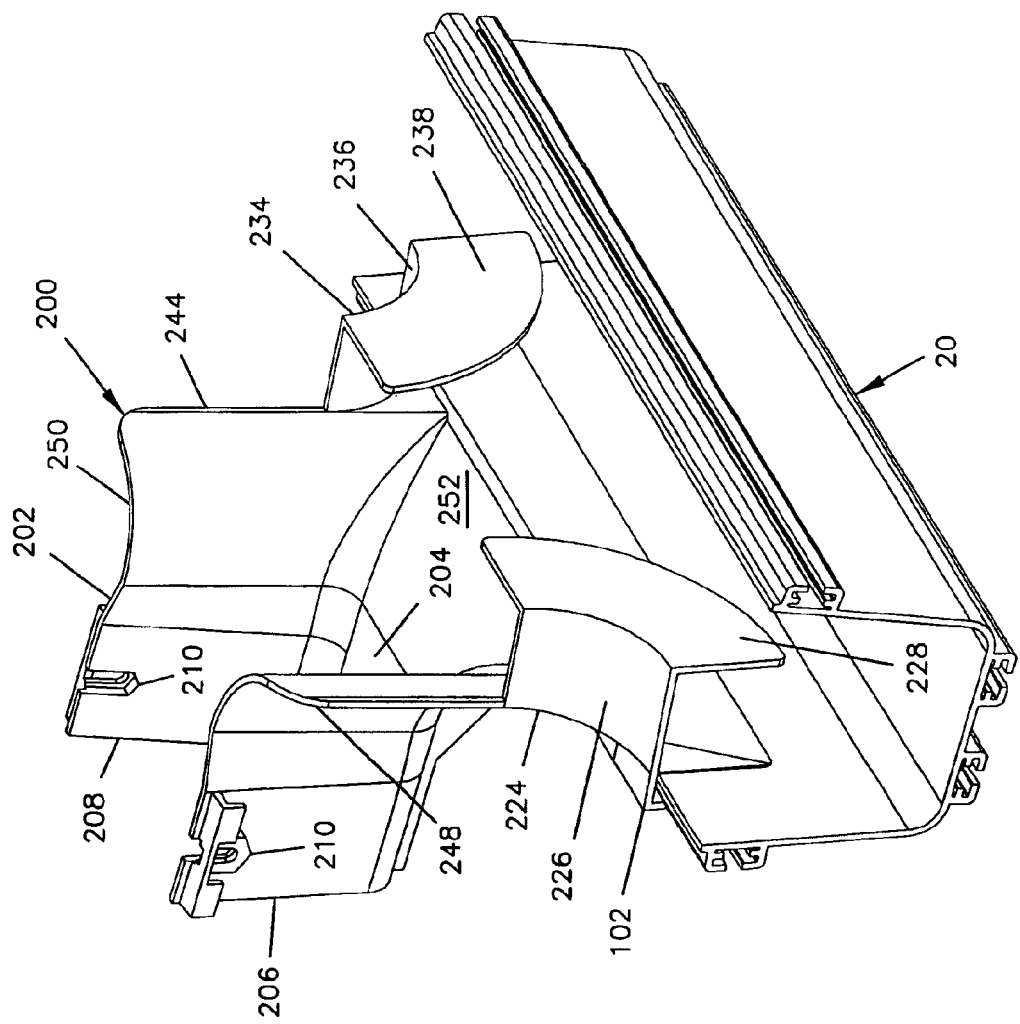
FIG. 9 is a top, front, and left side perspective view of a lateral trough section and an exit trough mounted thereto according to the second preferred embodiment of the present invention.
Figure 10:
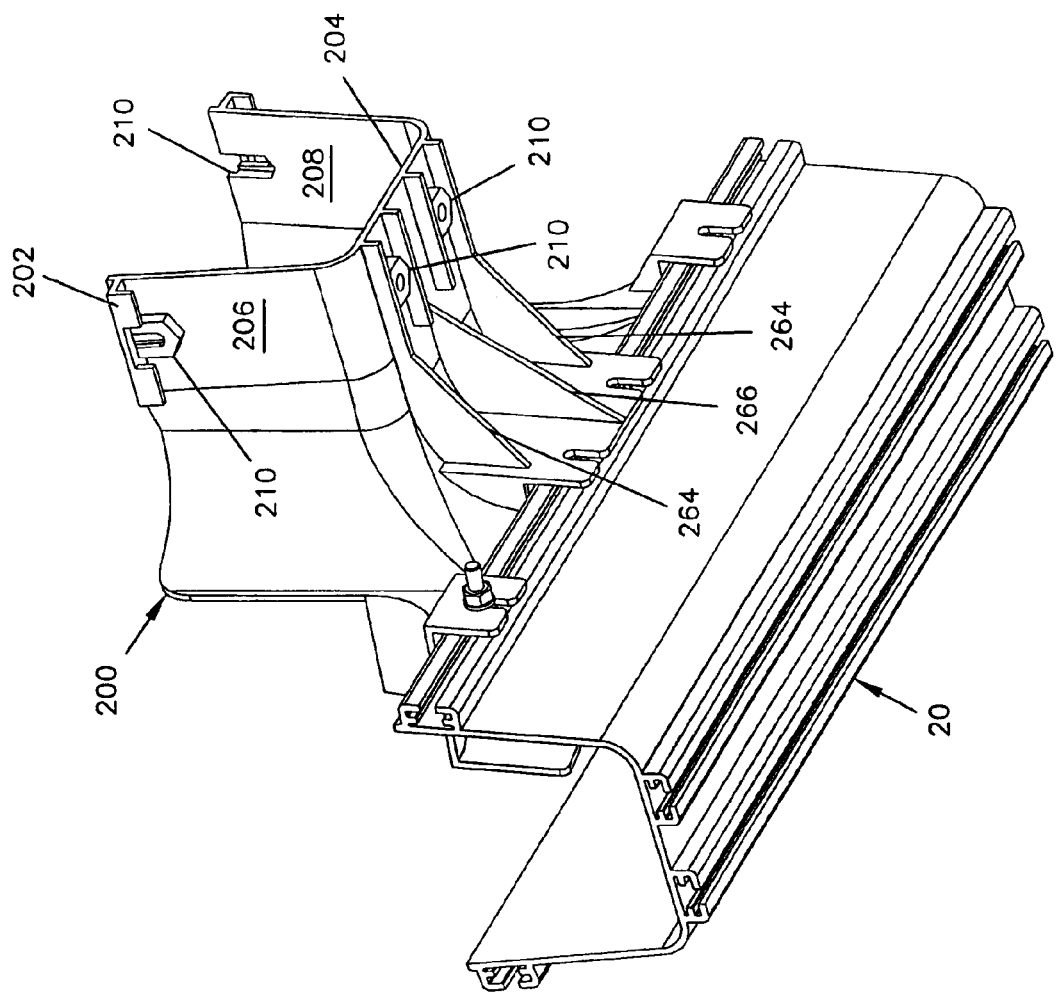
FIG. 10 is a bottom, back, and right side perspective view of the second embodiment.
Figure 11:
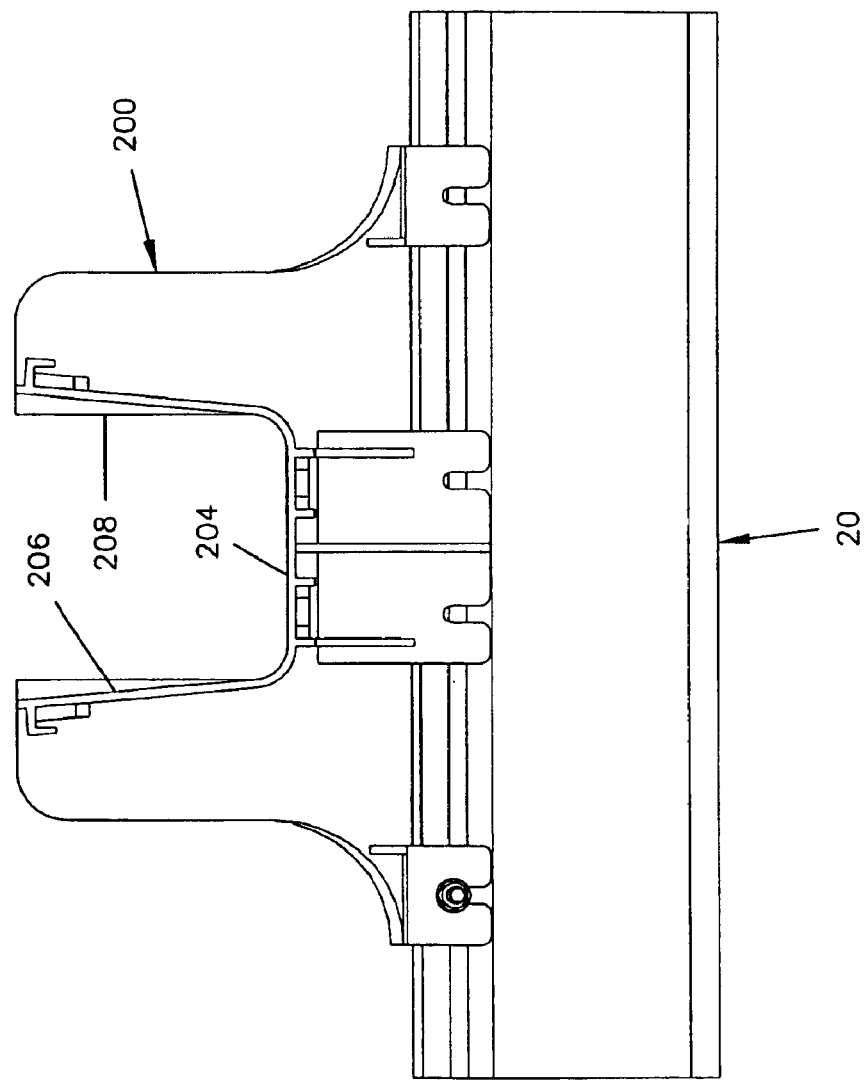
FIG. 11 is a back view of the second embodiment.
Figure 12:
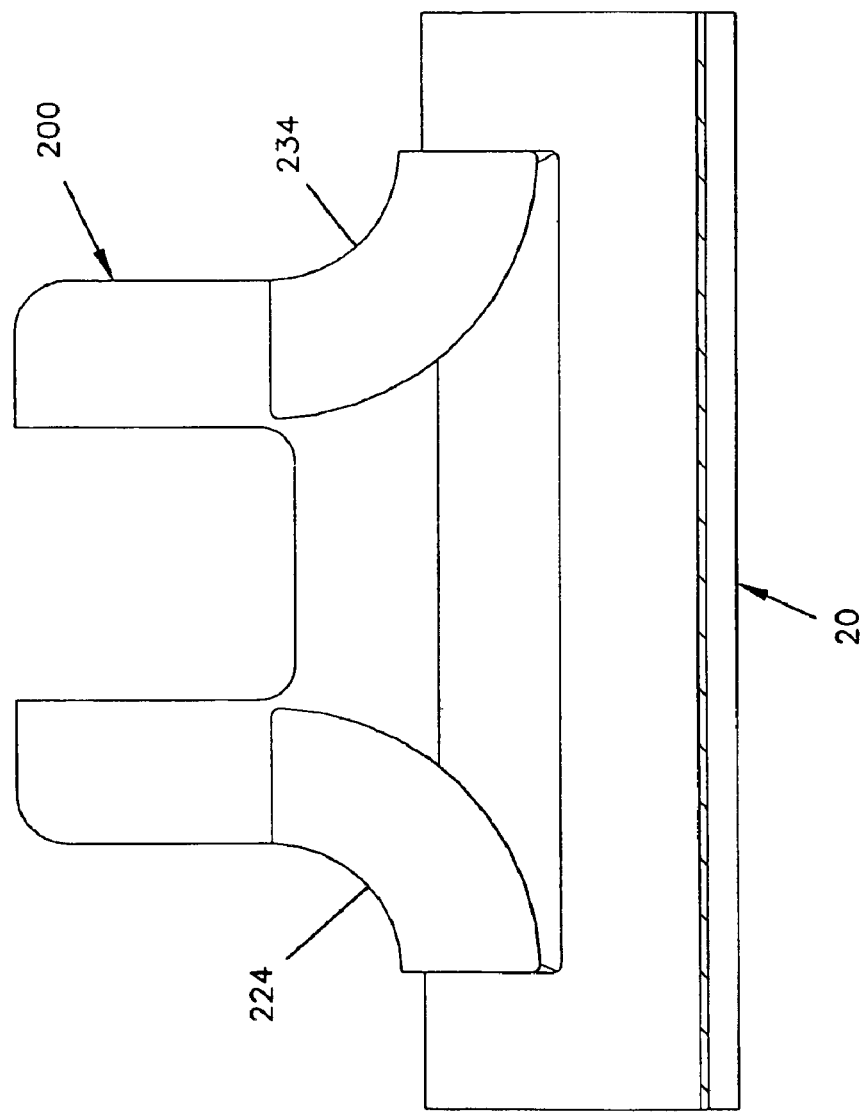
FIG. 12 is a front view of the second embodiment, and showing the lateral trough section in cross-section through a middle of the lateral trough section.
Figure 13:
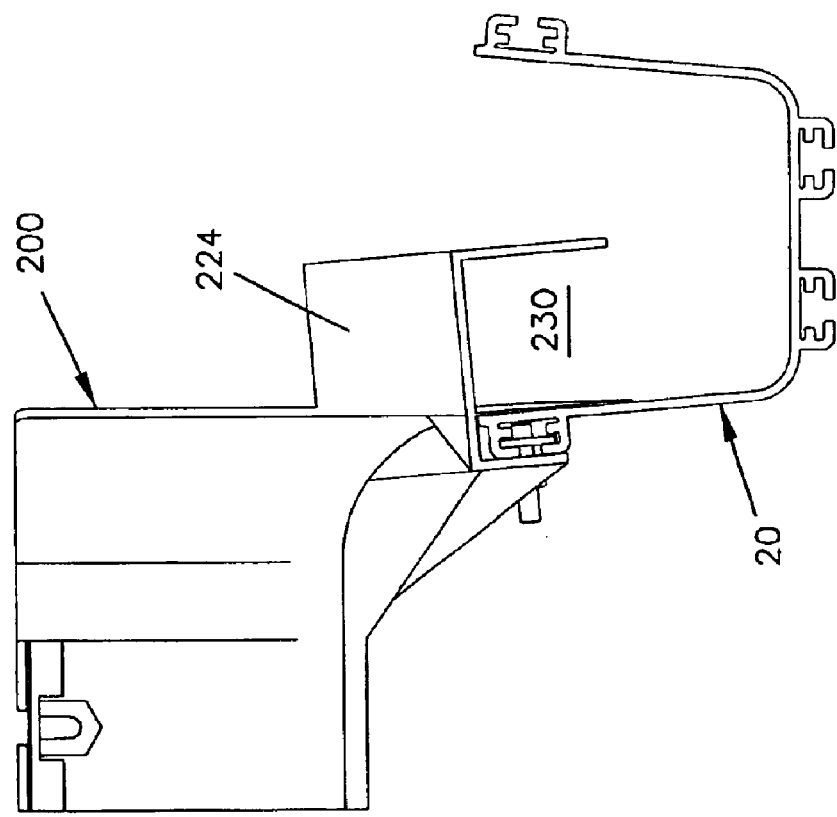
FIG. 13 is a left side view of the second embodiment.
Figure 14:
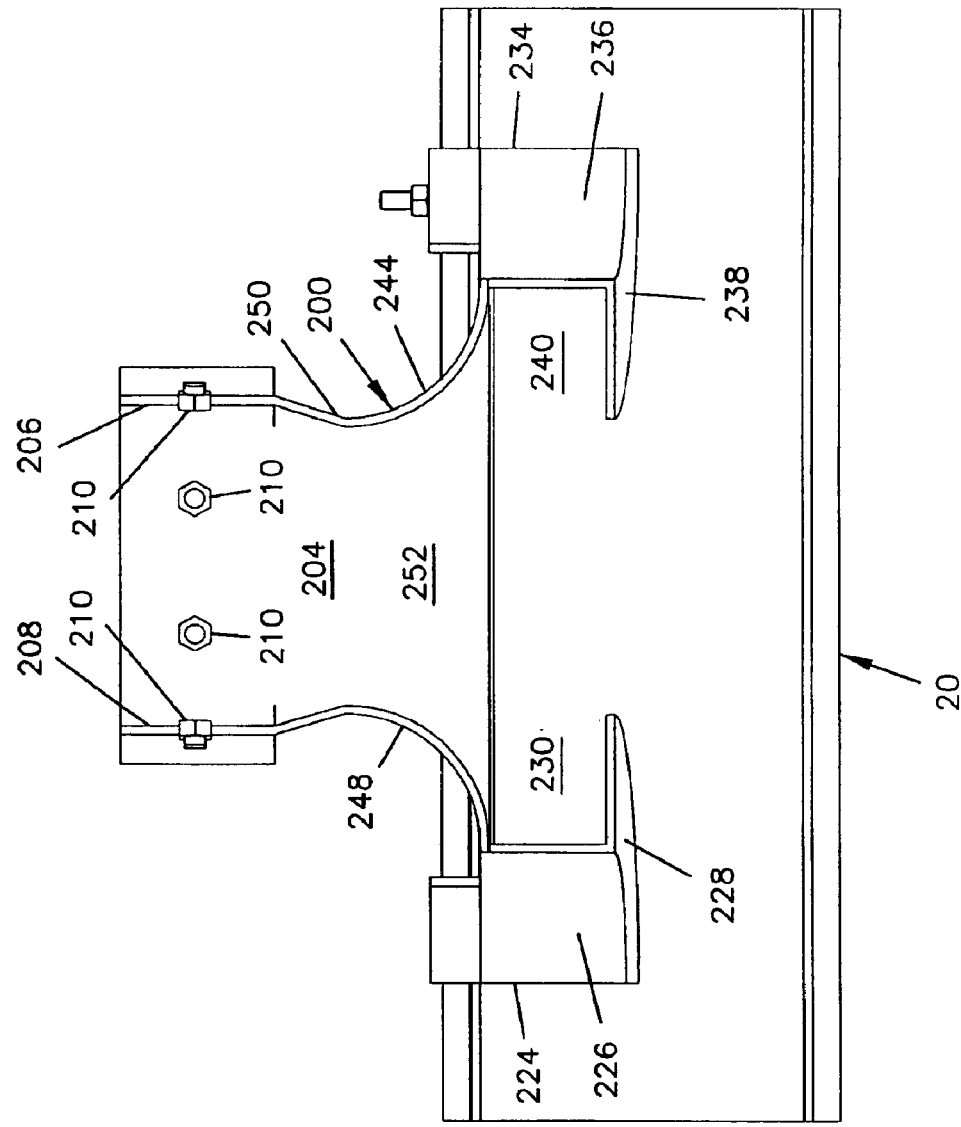
FIG. 14 is a top view of the second embodiment.
Figure 15:
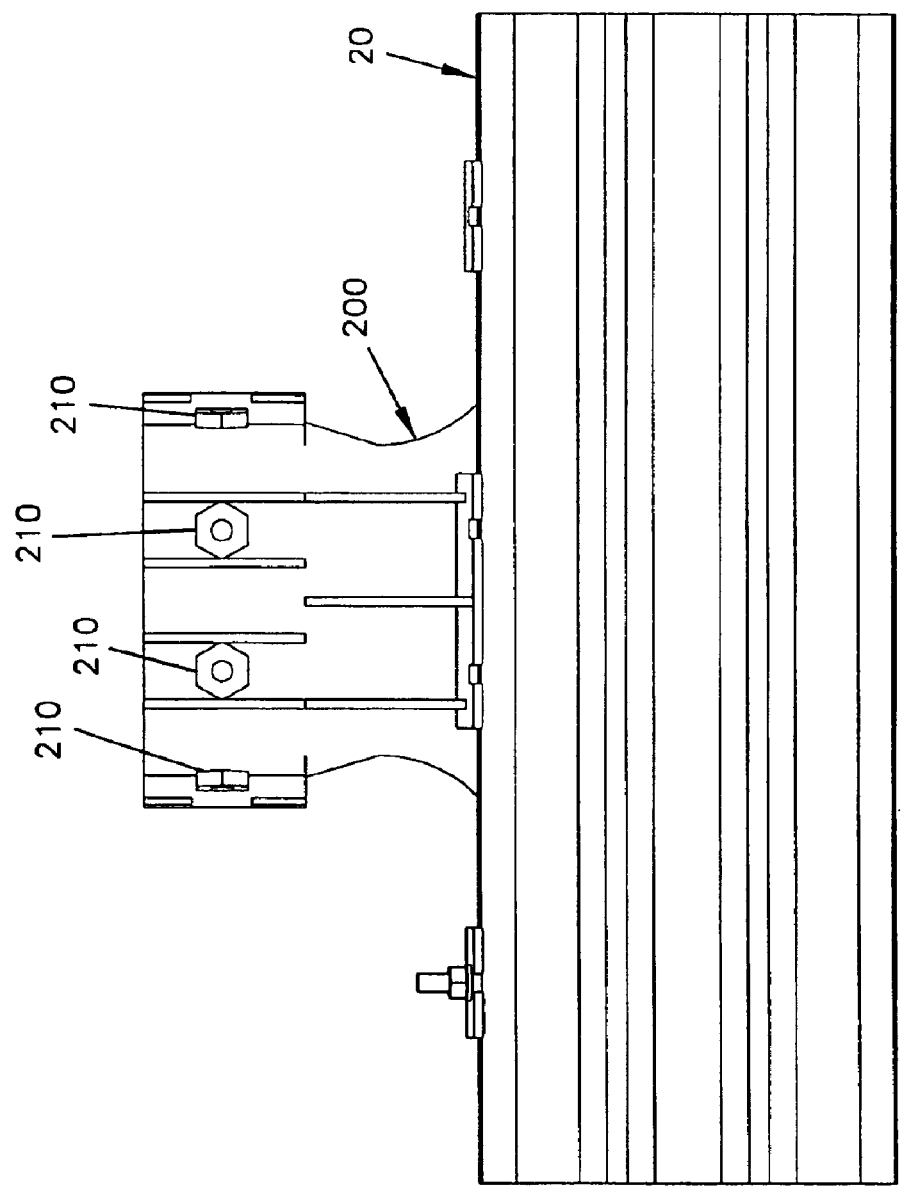
FIG. 15 is a bottom view of the second embodiment.
Figure 16:
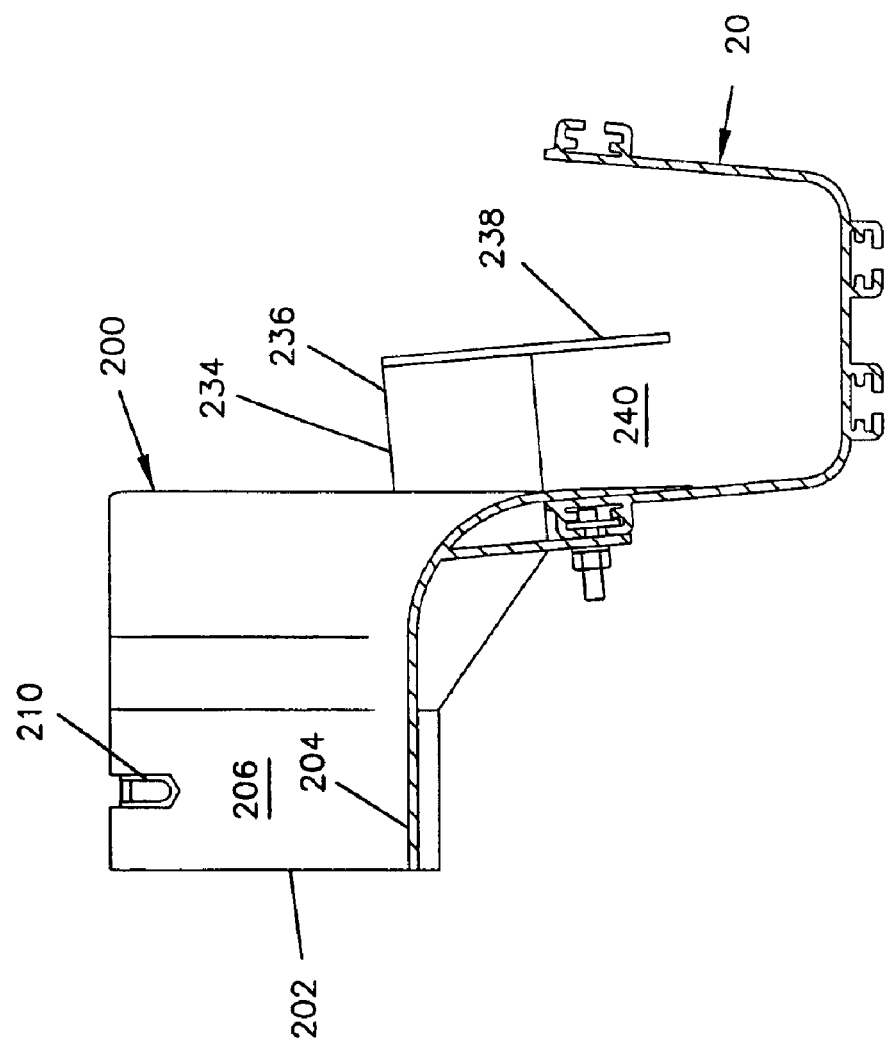
FIG. 16 is a left cross-sectional side view through the center of the lateral trough section and through the exit trough.

Exit trough 100 includes a bracket portion 102 including an outer projecting member 104, an inner projecting member 106, and a connecting member 108. Bracket portion 102 generally defines a U-shape for receipt of a portion of side 24 such that top edge 30 is positioned adjacent to connecting member 108. Exit trough 100 conveniently and securely mounts to lateral trough section 20 via one or more fasteners 170 positioned through outer projecting member 104 and engaged with attachment member 34 of lateral trough section 20, as shown in FIGS. 2, 3, and 5–8. As shown in FIGS. 2 and 3, outer projecting member 104 includes separate spaced apart portions 104a, 104b, 104c. Alternatively, the individual portions 104a–c could be constructed as a single piece. Portion 104a includes a slot 172 for receipt of fastener 170 during assembly. The other portions 104b and 104c include similar slots.

For protection of the optical fiber cables, inner projecting member 106 of bracket portion 102 includes tapered ends 110, 112, and a tapered middle 114. Bracket portion 102 generally extends from a first end 116 to a second end 118. A middle 120 is positioned between the first and second ends 116, 118. At first and second ends 116, 118, two cable lead-ins 124, 134 are provided. First lead-in 124 includes an upper surface portion 126 having an upwardly curved shape. A downwardly depending flange 128 extends toward bottom 28 of lateral trough section 20. Flange 128 is spaced apart from inner projecting member 106 of bracket portion 102 to define a cable pathway 130. Second lead-in 134 at an opposite end of bracket portion 102 faces in an opposite direction to first lead-in 124. Second lead-in 134 includes a similarly configured upwardly curved surface 136, and a downwardly depending flange 138 defining a cable pathway 140 for cables entering exit trough 100 from an opposite end of lateral trough section 20.

Exit trough 100 includes an exit trough portion 144 extending from bracket portion 102 at middle 120 away from lateral trough section 20. Exit trough portion 144 includes a bottom trough surface 146 and upstanding sides 148, 150 on opposite sides of bottom trough surface 146. Generally bottom trough surface 146 extends upwardly and away from top edge 30 of lateral trough section 20, and includes a convex shape. Upstanding sides 148, 150 extend from each respective lead-in 124, 134, and also define convex shapes. Exit trough portion 144 defines a cable pathway 152 linked to cable pathway 22 of lateral trough section 20 via cable pathways 130, 140 of lead-ins 124, 134.

In exit trough 100, exit trough portion 144 links lateral trough section 20 to a downspout 160. Downspout 160 generally provides a cable pathway for cable exiting in a downward direction relative to lateral trough section 20. Downspout 160 is supported by two side ribs 164 and a center rib 166 connected to bracket portion 104b.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

Referring now to FIGS. 9–16, a second embodiment of an exit trough 200 is shown. Like parts to parts in exit trough 100 are identified by the same reference numerals noted above for exit trough 100. Exit trough 200 differs in two main respects. First, instead of downspout 160, second exit trough 200 includes a horizontal portion 202 leading from exit trough portion 244. Horizontal portion 202 includes a generally horizontal bottom 204 and two upstanding sides 206, 208 leading from exit trough portion 244. Two side ribs 264, and a center rib 266 extending from bracket portion 102 support horizontal portion 202. Horizontal portion 202 is useful for linking lateral trough section 20 to other cable routing components interconnectable to horizontal portion 202 through any suitable means. Fastener recesses 210 are shown as one example of suitable structures for mounting to other components.

A second main difference between the second exit trough 200 and the first exit trough 100, is that lead-ins 224, 234 and exit trough portion 244 are sized to define larger cable pathways 230, 240, and 252. Specifically, upper surface portions 226, 236 and flanges 228, 238 are sized for defining the larger pathways 230, 240 relative to pathways 130, 140 of first exit trough 100. Also upstanding sides 248, 250 are taller and spaced further apart to define larger pathway 252 relative to pathway 152 of first exit trough 100. This illustrates that relative sizes of the features of exit troughs 100, 200 can be varied depending on the cable routing needs in the system.

Each of the disclosed exit troughs 100, 200 allows for exit pathways from the lateral trough section 20 without modification to the lateral trough section 20. This is useful during initial system setup, and also during modifications of the system at later dates. Exit troughs 100, 200 can be added at any time quickly and easily. Cable damage is avoided since any cables in lateral trough section 20 are not disturbed and do not have to be moved when exit troughs 100, 200 are added. Also, simple fasteners are all that is needed to mount the bracket portion 102 of the exit troughs 100, 200 to the lateral trough section 20. In addition to the downspout 160, and the horizontal portion 202, other directional components are possible from exit trough portions 144, 244 of each exit trough 100, 200.

Having described the present invention in a preferred embodiment, modifications and equivalents may occur to one skilled in the art. It is intended that such modifications and equivalents shall be included within the scope of the claims which are appended hereto.

What is claimed is:

1. A cable exit trough mountable to a lateral trough section, the lateral trough section including an upstanding side terminating in a top edge, the cable exit trough comprising:

a U-shaped bracket portion sized to engage a portion of the upstanding side of the lateral trough section adjacent to the top edge of the lateral trough section, the bracket portion including an outer projecting member, an inner projecting member, and a connecting member to form the U-shaped bracket portion, the outer projecting member positionable outside the lateral trough section, the inner projecting member positionable inside the lateral trough section, the connecting member positionable above the top edge of the lateral trough section;

first and second lead-in portions interconnected to the U-shaped bracket portion, the first and second lead-in portions each defining a lead-in cable pathway; and an exit trough portion interconnected to the first and second lead-in portions, the exit trough portion including an exit cable pathway extending in a direction away from the lateral trough section when the exit trough is mounted to the lateral trough section, the exit cable pathway being at least partially defined by a curved bottom trough surface of sufficient curvature to maintain a minimum cable bend radius;

wherein the first and second lead-in portions extend upwardly toward the exit trough portion when the cable exit trough is mounted to the lateral trough section, each of the lead-in cable pathways of the first and second lead-in portions being in communication with the exit cable pathway of the exit trough portion.

2. The cable exit trough of claim 1, wherein each lead-in portion includes a downwardly depending flange, the lead-in cable pathway being at least partially defined between the flange and the inner projecting member of the bracket portion.

3. The cable exit trough of claim 1, wherein the first and second lead-in portions converge toward one another.

4. The cable exit trough of claim 1, wherein the exit trough portion is a first exit trough portion, and further comprising a second exit trough portion communicating with the first exit trough portion, the second exit trough portion having a downwardly curved shape defining a downspout when the exit trough is mounted to the lateral trough section.

5. The cable exit trough of claim 1, wherein the exit trough portion is a first exit trough portion, and further comprising a second exit trough portion communicating with the first exit trough portion, the second exit trough portion having a lateral portion defining a generally horizontally extending section when the exit trough is mounted to the lateral trough section.

6. A method of routing a cable in a cable routing system, the method comprising the steps of:

providing a cable exit trough mountable to a lateral trough section, the cable exit trough having an upper portion and a lower portion;

releasably mounting the lower portion of the cable exit trough adjacent to a top edge of the lateral trough section, without cutting the top edge of the lateral trough section; and routing a cable from the lateral trough section over the top edge of the lateral trough section and into a cable exit pathway defined by the upper portion of the cable exit trough.

7. The method of claim 6, wherein the cable has a length between the lateral trough section and an exit of the cable exit pathway, the method further including maintaining a minimum bend radius along the length of the cable.

8. The method of claim 7, wherein the cable exit pathway includes a pathway portion extending in a direction generally perpendicular to the lateral trough section.

9. The method of claim 6, further including positioning a flange of the cable exit trough at least partially within the lateral trough section when the cable exit trough is releasably mounted to the lateral trough section.

10. The method of claim 9, wherein the flange at least partially defines a lead-in pathway in communication with the cable exit pathway, the method further including routing the cable through the lead-in pathway and into the cable exit pathway.

11. The method of claim 6, wherein the cable is routed upwardly from the lateral trough section prior to being routed into the cable exit pathway defined by the upper portion of the cable exit trough.

12. The method of claim 6, further including curving the cable upward and in a direction transverse to the lateral trough section.

13. A cable exit trough mountable to a lateral trough section, the cable exit trough comprising:

a mounting structure configured to releasably mount the cable exit trough to the lateral trough section;

a first inner portion positioned inside the lateral trough when the cable exit trough is mounted to the lateral trough section;

a second outer portion positioned outside of the lateral trough when the cable exit trough is mounted to the lateral trough section;

a cable trough portion defining a cable exit pathway that extends between the first inner portion and the second outer portion, the cable trough portion including a curved bottom surface constructed to maintain a minimum cable bend radius;

wherein a cable passes over a top edge of the lateral trough section when routed in the cable exit pathway of the cable trough portion.

14. The cable exit trough of claim 13, wherein the first inner portion defines a lead-in pathway, the lead-in pathway being in communication with the cable exit pathway.

15. The cable exit trough of claim 13, wherein the first inner portion defines first and second lead-in pathways in communication with the cable exit pathway.

16. The cable exit trough of claim 13, wherein the second outer portion includes a downspout.

17. The cable exit trough of claim 13, wherein the cable trough portion includes curved sidewalls located on opposite sides of the curved bottom surface, the curved sidewalls being constructed to maintain a minimum cable bend radius.

18. The cable exit trough of claim 13, wherein the mounting structure is configured to mount the cable exit trough to an upstanding sidewall of the lateral trough section, the upstanding sidewall having a substantially uniform height.

* * * * *

US006925242C1

(12) INTER PARTES REEXAMINATION CERTIFICATE (1000th)
United States Patent
Haataja et al.

(10) Number: US 6,925,242 C1
(45) Certificate Issued: *Nov. 21, 2014

(54) OPTICAL CABLE EXIT TROUGH

(75) Inventors: Timothy Jon Haataja, Prior Lake, MN (US); Thomas Walter Kampf, Minnetonka, MN (US)

(73) Assignee: ADC Telecommunications, Inc., Minnetonka, MN (US)

Reexamination Request:
No. 95/000,415, Nov. 6, 2008

Reexamination Certificate for:
Patent No.: 6,925,242
Issued: Aug. 2, 2005
Appl. No.: 10/871,641
Filed: Jun. 18, 2004

( * ) Notice: This patent is subject to a terminal disclaimer.

Related U.S. Application Data

(60) Continuation of application No. 10/457,749, filed on Jun. 9, 2003, now Pat. No. 6,868,220, which is a continuation of application No. 09/745,299, filed on Dec. 20, 2000, now Pat. No. 6,597,854, which is a continuation of application No. 09/354,594, filed on Jul. 16, 1999, now Pat. No. 6,192,181, which is a division of application No. 08/971,421, filed on Nov. 17, 1997, now Pat. No. 5,937,131.

(51) Int. Cl.
*G02B 6/44* (2006.01)

(52) U.S. Cl.
USPC .......................................... 385/136; 385/137

(58) Field of Classification Search
None
See application file for complete search history.

(56) References Cited

To view the complete listing of prior art documents cited during the proceeding for Reexamination Control Number 95/000,415, please refer to the USPTO's public Patent Application Information Retrieval (PAIR) system under the Display References tab.

*Primary Examiner* — Peter C. English

(57) ABSTRACT

A cable exit trough is mountable to a lateral trough section either during initial assembly of the cable routing system, or at a later date. The exit trough includes a bracket portion mountable to the top edge of one of the sides of the lateral trough section. Two lead-ins are provided to lead the cable in an upward direction from the lateral trough section to the exit trough. The exit trough includes an exit trough portion extending from the bracket portion upwardly away from the lateral trough section. The exit trough portion includes a convexly curved bottom trough surface, and two convexly curved upstanding sides. The exit trough portion and the lead-ins define a cable pathway from the lateral trough section to an exit point of the exit trough portion which can either lead downwardly relative to the lateral trough section, or horizontally.

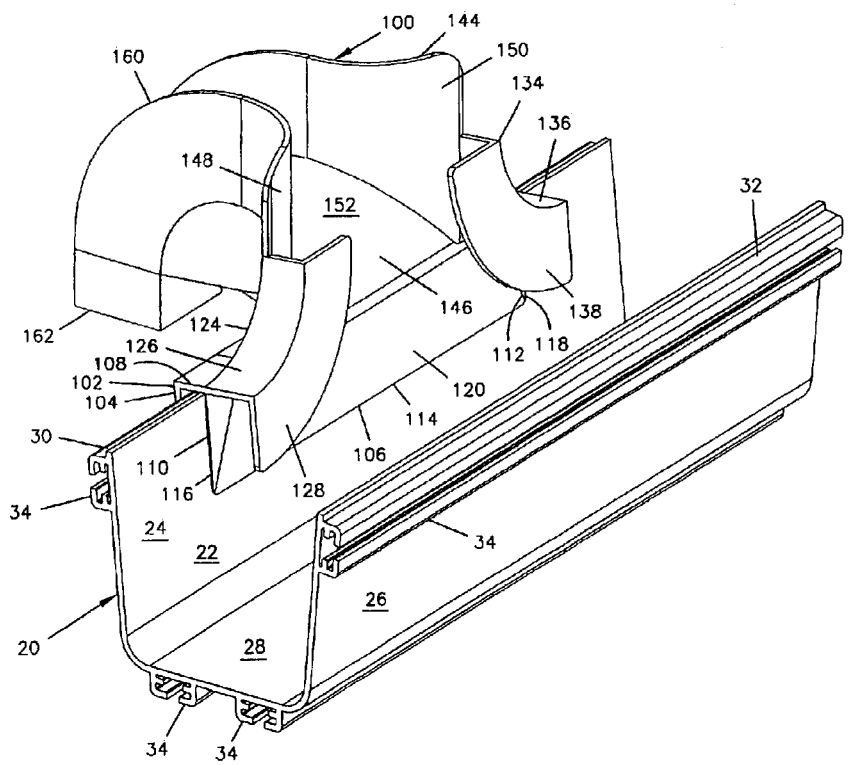

US 6,925,242 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 2 is confirmed.

Claims 1 and 3-12 are cancelled.

Claims 13-18 are determined to be patentable as amended.

New claims 19-30 are added and determined to be patentable.

13. A *cable exit trough system comprising:*
  *a cable exit trough and a lateral trough having a lateral trough section, the lateral trough section having a base and an upstanding side, the* cable exit trough mountable to a lateral trough section, *the lateral trough and lateral trough section being horizontal to the ground to define a horizontal cable pathway for routing cables horizontally to the ground, wherein the lateral trough has an upstanding side that includes the upstanding side of the lateral trough section, wherein the upstanding side of the lateral trough has a substantially uniform cross section between a first end and a second end of the lateral trough;* the cable exit trough comprising:
  a mounting structure configured to releasably mount the cable exit trough to the lateral trough section;
  a first inner portion positioned inside the lateral trough when the cable exit trough is mounted to the lateral trough section;
  a second outer portion positioned outside of the lateral trough when the cable exit trough is mounted to the lateral trough section;
  a cable trough portion defining a cable exit pathway that extends between the first inner portion and the second outer portion, the cable trough portion including a curved bottom surface constructed to maintain a minimum cable bend radius, *the bottom surface including a curved portion that leads upwardly and away from the lateral trough section after extending over an upstanding side of the lateral trough section*;
  wherein a cable passes over a top edge of the lateral trough section when routed in the cable exit pathway of the cable trough portion; *and*
  *wherein the cable exit trough further includes an upper surface, wherein the upper surface curves upward relative to the base of the lateral trough section and defines a top boundary of at least a portion of a cable path.*

14. The cable exit trough *system* of claim 13, wherein the first inner portion defines a lead-in pathway, the lead-in pathway being in communication with the cable exit pathway.

15. The cable exit trough *system* of claim 13, wherein the first inner portion defines first and second lead-in pathways in communication with the cable exit pathway.

16. The cable exit trough *system* of claim 13, wherein the second outer portion includes a downspout, *and wherein the upper surface is located outside of a volume of the lateral trough when the cable exit trough is mounted to the lateral trough section, and wherein the upper surface is curved to maintain a cable minimum bend radius.*

17. The cable exit trough *system* of claim 13, wherein the cable trough portion includes curved sidewalls located on opposite sides of the curved bottom surface, the curved sidewalls being constructed to maintain a minimum cable bend radius.

18. The cable exit trough *system* of claim 13, wherein the mounting structure is configured to mount the cable exit trough to an upstanding sidewall of the lateral trough section, the upstanding sidewall having a substantially uniform height.

*19. A method of routing a cable in a cable routing system, the method comprising the steps of:*
  *providing a cable exit trough mountable to a lateral trough section having an upstanding side, the cable exit trough having an upper portion and a lower portion;*
  *releasably mounting the lower portion of the cable exit trough adjacent to a top edge of the upstanding side of the lateral trough section, without cutting the top edge or the upstanding side of the lateral trough section; and*
  *routing a cable from the lateral trough section over the top edge of the lateral trough section and into a cable exit pathway defined by the upper portion of the cable exit trough;*
  *the upper portion having a curved bottom surface and two curved side walls positioned on opposite sides of the bottom surface to define the cable exit pathway, the curved bottom surface and the two curved side walls being sufficiently curved to maintain a cable minimum bend radius for cables entering the exit trough from opposite ends of the lateral trough section.*

*20. A method of routing a cable in a cable routing system, the method comprising the steps of:*
  *providing a cable exit trough mountable to a lateral trough section having an upstanding side, the cable exit trough having an upper portion and a lower portion;*
  *releasably mounting the lower portion of the cable exit trough adjacent to a top edge of the upstanding side of the lateral trough section, without cutting the top edge or the upstanding side of the lateral trough section; and*
  *routing a cable from the lateral trough section over the top edge of the lateral trough section and into a cable exit pathway defined by the upper portion of the cable exit trough;*
  *the upper portion having a bottom surface, the bottom surface having a curved portion leading upwardly with respect to the lateral trough section while maintaining a cable minimum bend radius, the curved portion of the bottom surface curving from a substantially vertical orientation to at least a substantially horizontal orientation.*

*21. The cable exit trough system of claim 13, wherein the distance between first and second ends of the lateral trough section is longer than the longest dimension of the cable exit trough in a direction horizontal to the ground along the cable pathway when mounted to the lateral trough section.*

*22. A method of routing a cable in a cable routing system, the method comprising the steps of:*
  *providing a lateral trough section and a cable exit trough mountable to the lateral trough section, the lateral trough section being horizontal to the ground to define a cable pathway so that cables routed through the lateral trough section also run horizontal to the ground along the cable pathway, the lateral trough section having an upstanding side of substantially uniform height between* a first end and a second end of the lateral trough section, wherein the distance between the first and second ends of the lateral trough section is longer than the longest dimension of the cable exit trough in a direction horizontal to the ground along the cable pathway when mounted to the lateral trough section, the cable exit trough having an upper portion and a lower portion;

releasably mounting the lower portion of the cable exit trough adjacent to a top edge of the upstanding side of the lateral trough section, without cutting the top edge or the upstanding side of the lateral trough section; and routing a cable from the lateral trough section over the top edge of the lateral trough section and into a cable exit pathway defined by the upper portion of the cable exit trough; and wherein the upper portion that defines the cable exit pathway includes a curved bottom surface that, while maintaining a minimum bend radius, transitions to substantially vertical to guide cables exiting the lateral trough section to a substantially vertical orientation relative to the ground.

23. The method of claim 22, wherein the cable has a length between the lateral trough section and an exit of the cable exit pathway, the method further including maintaining a minimum bend radius along the length of the cable.

24. The method of claim 23, wherein the cable exit pathway includes a pathway portion extending in a direction generally perpendicular to the lateral trough section.

25. The method of claim 22, further including positioning a flange of the cable exit trough at least partially within the lateral trough section when the cable exit trough is releasably mounted to the lateral trough section.

26. The method of claim 25, wherein the flange at least partially defines a lead-in pathway in communication with the cable exit pathway, the method further including routing the cable through the lead-in pathway and into the cable exit pathway.

27. The method of claim 22, wherein the cable is routed upwardly from the lateral trough section prior to being routed into the cable exit pathway defined by the upper portion of the cable exit trough.

28. The method of claim 22, further including curving the cable upward and in a direction transverse to the lateral trough section.

29. The method of claim 22, wherein the upper portion of the cable exit trough includes an upper surface that curves upward relative to a base of the lateral trough section and defines an upper surface of a cable path such that at least a portion of the upper surface is positioned above and at least partially facing cables routed through the cable exit trough, the upper surface being curved to maintain a minimum bend radius.

30. The method of claim 29, wherein the upper surface is located outside of a volume of the lateral trough section when the cable exit trough is mounted to the lateral trough section.

* * * * *